Jan. 30, 1951     H. A. QUIST     2,539,925

OUTAGE BOB

Filed Oct. 16, 1947

INVENTOR.
HAROLD A. QUIST
BY
*Susser and Harding*
ATTORNEYS

Patented Jan. 30, 1951

2,539,925

UNITED STATES PATENT OFFICE 2,539,925

OUTAGE BOB

Harold A. Quist, Elkton, Md., assignor to Sun Oil Company, Philadelphia, Pa., a corporation of New Jersey Application October 16, 1947, Serial No. 780,276

3 Claims. (Cl. 33—126.5)

This invention relates to tank gauges generally and specifically to gauges of the type where a weight or bob is suspended by a tape measure for lowering into receptacles in order to measure the liquid contents.

The principal object of the invention is to disclose a bob which continues the exact tape measure graduations throughout its length.

Another object is to disclose a bob which is detachable from the suspending tape measure which will, when attached, make the graduations on the bob coincide with the tape measure markings.

A further object is to provide a bob with a hook and spring retainer as part of the bob structure for holding the tape measure, both of which can be removed and replaced when required to maintain the accuracy of the measuring device.

With the above and other objects as will appear from the description and appended claims, the arrangement of the parts will be fully described and are illustrated in the drawings wherein:

Figure 1:
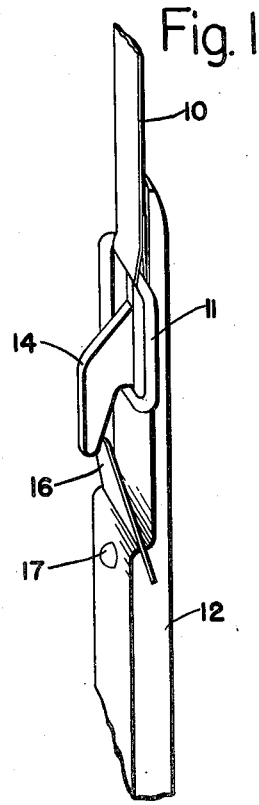
Figure 1 is an overhead, perspective view.
Figure 2:
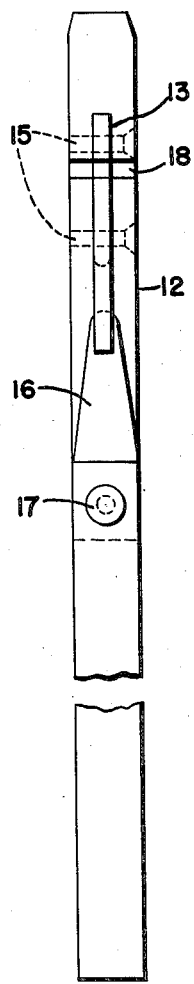
Figure 2 is an elevation of the hook and spring clips face.

Referring to the drawing wherein like numerals of reference designate similar parts in each of the figures, the numeral 10 designates a tape measure with ring 11 fastened at the end and forming a full unit of measurement with the graduations on the face of the tape. The plumb-bob 12 is slotted at 13 to receive hook 14 over which loop 11 of the tape measure is passed in order to suspend plumb-bob 12 in the measuring position. The metal screws 15 maintain the hook 14 in rigid position and, also, permit the replacement of the hook 14 when, through wear or damage, it no longer aligns the suspending measuring tape graduations with the graduations on plumb-bob 12. The spring clip 16 is retained in position to cooperate with the hook 14 by the metal screw or bolt 17 which secures it.

Figure 4:
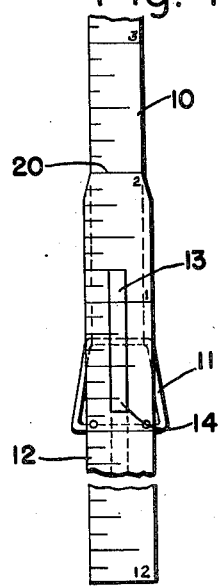
Figure 4 is an elevation of the graduated face of the bob.

In Figure 1 of the drawing, the perspective view shows plumb-bob 12 suspended by tape measure 10 in the operating position. The ring 11 contacts with the under side of the hook 14 so that the tape measure 10 is aligned with the plumb-bob 12 and the graduations on the tape measure coincide exactly with the graduations on the plumb-bob as shown in Figure 4. By such construction the exact measurement within a liquid storage tank may be obtained. Hitherto, plumb-bobs have been suspended from tape measures by a spring clip device which interrupted the measurement of the plumb-bob in prolongation of the graduations on the tape measure. This old construction left the matter of gauging as a matter of guess on the part of the operator or required the loss of time in repeated measurements in order to check the exact measurement of the space between the clip and the plumb-bob.

Figure 3:
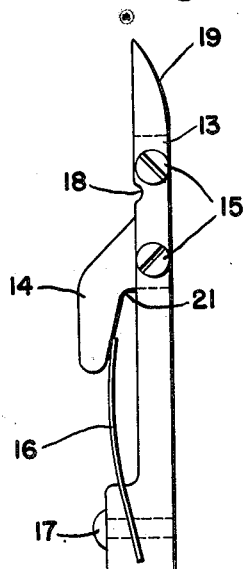
Figure 3 is a side elevation.

With the device as disclosed in this specification, a notch 18, as shown in Figure 3, permits the tape measure 10 to meet the plumb-bob 12 flush at the point of suspension. The plumb-bob is beveled at the upper end 19 to enable the operator to ascertain that the graduations are in exact alignment before gauging as shown at point 20 on Figure 4.

Repeated use of the gauge will, after a time, wear hook 14 where it engages ring 11 indicated as surface 21 on Figure 3. With the type of plumb-bob as disclosed here, a replacement of hook 14 can be made, readily placing the plumb-bob ready for immediate and exact use.

Reference to Figure 4 shows a view of the plumb-bob on the face opposite to that from which hook 14 and spring clip 15 project. In the preferred embodiment of the device the graduations are placed on this face permitting an offset for the spring 16 and hook 14 assembly so that plumb-bob 12 will hang in exact prolongation of tape measure 10 and enable the plumb-bob to be made sufficiently heavy to be effective when suspended from considerable height. This offset is shown clearly in Figure 3. Returning again to Figure 4, it will be noticed that the lower most edge of the suspending ring 11, which has been noted above as an exact extension of the graduations on tape measure 10, coincides with the zero line on the graduated face of the plumb-bob 12. In the illustration, the plumb-bob 12 is graduated from this zero line in both directions, ending at the two inch mark where the tape measure 10 and the plumb-bob 12 are in alignment at point 20. From the zero point where suspending ring 11 is in engagement with hook 14, the plumb-bob is graduated downwardly along its length terminating at the twelve inch mark as shown in the sectional view portion of Figure 4.

It will be evident from the above disclosure and drawings that many modifications may be made of the device as it is detailed herein. The preferred disclosure eliminates any guess work due to unmeasured lengths such as are common in the existing art where plumb-bobs are suspended by swivel connections and clips and places this preferred and simple method of measuring tank contents in the field of exact measurements, thereby enabling the continuance of already established measuring procedures and raising the procedure to an exact standard.

I claim:

1. An instrument for measuring the contents of a tank comprising, in combination, a graduated measuring tape, a ring attached to the end of said tape dimensioned to exactly extend the tape graduations, a graduated bob, a hook forming part of the body of said bob adjacent the upper end and extending laterally outwardly therefrom to receive said ring, the ring bearing surface of said hook being spaced upwardly from the level of the zero graduation on the bob a distance such that the lowermost edge of the ring when engaged is accurately at the level of the zero graduation on said bob, and a spring clip secured to the body of the bob in operating engagement with said hook to retain the ring thereon during operation, whereby the graduations of the bob and tape are in exact prolongation of each other.

2. A bob to weight a measuring tape comprising a rod of rectangular cross-section, one face of which is graduated; a laterally extending hook to engage the tape positioned in spaced relation from the end of said rod and forming a part of the body thereof, the tape engaging surface of said hook being spaced from the level of the zero datum of the tape when engaged a distance and direction such that the zero datum of the tape is exactly at the level of the zero graduation on the bob; and a spring clip secured to said rod below and in cooperating engagement with said hook.

3. The bob in claim 2 further characterized by the graduations on said bob marked in ascending scale upwardly and downwardly from said zero graduation.

HAROLD A. QUIST.

REFERENCES CITED

The following references are of record in the file of this patent:

UNITED STATES PATENTS

| Number | Name | Date |
|---|---|---|
| 2,006,301 | Meyer | June 25, 1935 |
| 2,157,024 | Smith | May 2, 1939 |
| 2,226,060 | Johnson | Dec. 24, 1940 |

FOREIGN PATENTS

| Number | Country | Date |
|---|---|---|
| 594,332 | Germany | Mar. 15, 1934 |